United States Patent [19]

Edahiro et al.

[11] Patent Number: 5,253,239
[45] Date of Patent: Oct. 12, 1993

[54] CONTROL APPARATUS FOR TRACKNG A LIGHT BEAM ON A TRACK OF AN OPTICAL RECORDING MEDIUM

[75] Inventors: Yasuaki Edahiro, Hirakata; Katsuya Watanabe, Suita; Mitsuro Moriya, Ikoma, all of Japan

[73] Assignee: Matsushita Electric Industrial Co., Ltd., Osaka, Japan

[21] Appl. No.: 614,496

[22] Filed: Nov. 16, 1990

[30] Foreign Application Priority Data

Nov. 24, 1989 [JP] Japan .................................. 1-305419
Apr. 18, 1990 [JP] Japan .................................. 2-101960

[51] Int. Cl.$^5$ .............................................. G11B 7/095
[52] U.S. Cl. ............................ 369/44.28; 369/44.29; 369/44.32; 369/54
[58] Field of Search ........................ 369/44.25–44.36, 369/32, 124, 47, 48, 44.13, 44.11, 54, 78.05; 250/201.5; 360/72.1, 77.01, 77.11, 78.01

[56] References Cited

U.S. PATENT DOCUMENTS

| | | | |
|---|---|---|---|
| 4,611,316 | 9/1986 | Takeuchi et al. | 369/44.32 |
| 4,654,516 | 3/1987 | Ando | 369/44.34 |
| 4,751,695 | 6/1988 | Kaku et al. | 369/44.35 |
| 4,796,246 | 1/1989 | Tsuyoshi et al. | 369/44.29 |
| 4,805,163 | 2/1989 | Ohnuki | 369/44.32 |
| 4,807,210 | 2/1989 | Kaku et al. | 369/44.13 |
| 4,833,664 | 5/1989 | Shiragami et al. | 369/44.27 |
| 4,866,688 | 9/1989 | Ohtake et al. | 369/44.12 |
| 5,063,549 | 11/1991 | Yamamuro | 369/44.29 |

FOREIGN PATENT DOCUMENTS

| | | |
|---|---|---|
| 0260987 | 3/1988 | European Pat. Off. . |
| 0264920 | 4/1988 | European Pat. Off. . |
| 0272873 | 6/1988 | European Pat. Off. . |
| 6356818 | 3/1983 | Japan . |

Primary Examiner—W. R. Young
Assistant Examiner—Thang V. Tran
Attorney, Agent, or Firm—Stevens, Davis, Miller & Mosher

[57] ABSTRACT

A tracking control apparatus is disclosed, in which a light beam is focused on an optical recording medium to form a light spot thereon, and a tracking error signal corresponding to a maximum or minimum point of total reflected light from a portion of the optical recording medium, which is irradiated by the light spot, is detected and used as a desired value for tracking servo control, whereby accurate tracking servo control can be made without producing any offset even when the surface of the optical recording medium is inclined or the optical axis of the light reflected from the optical recording medium deviates from a proper direction.

18 Claims, 13 Drawing Sheets

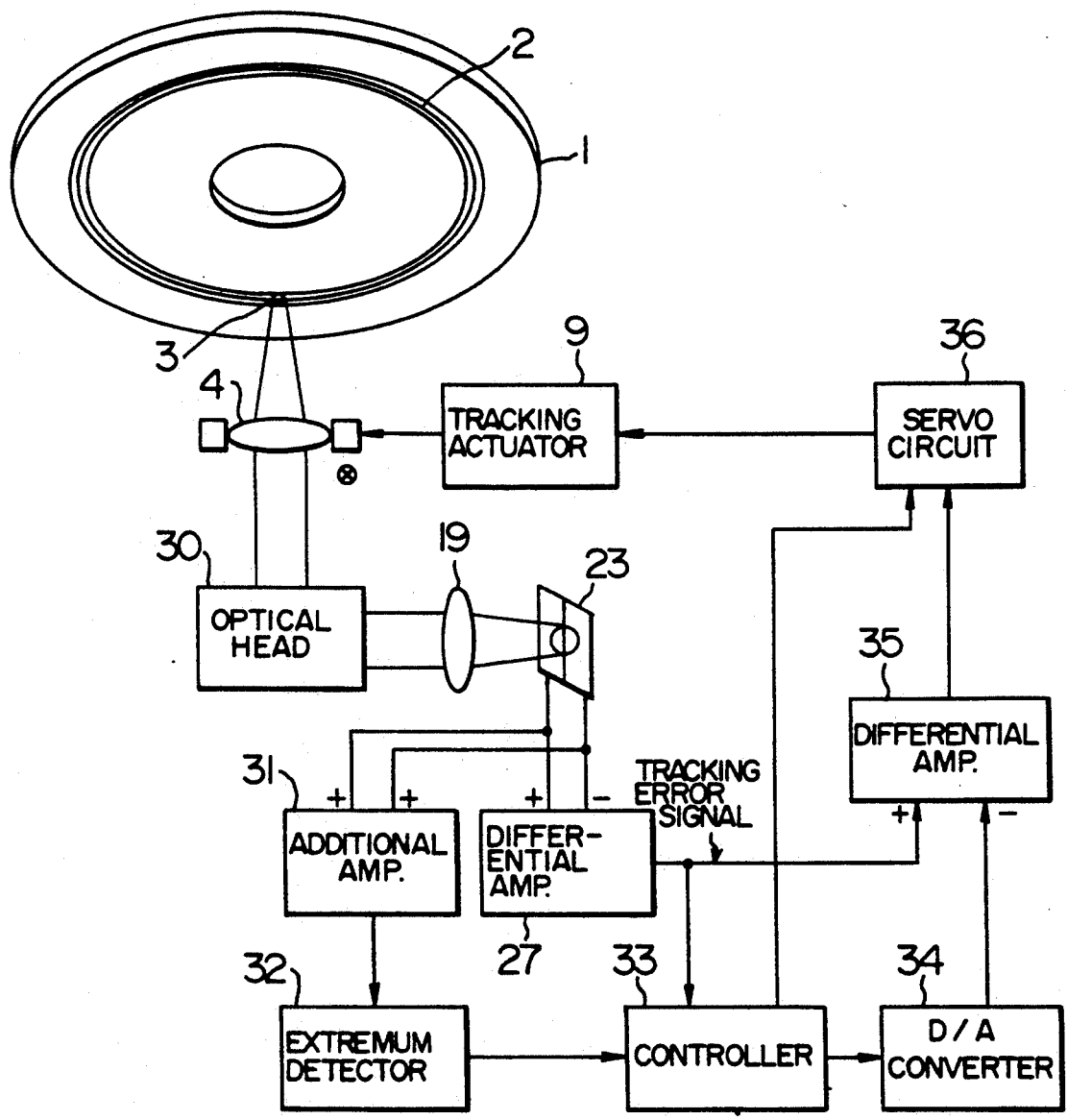
F I G. 3

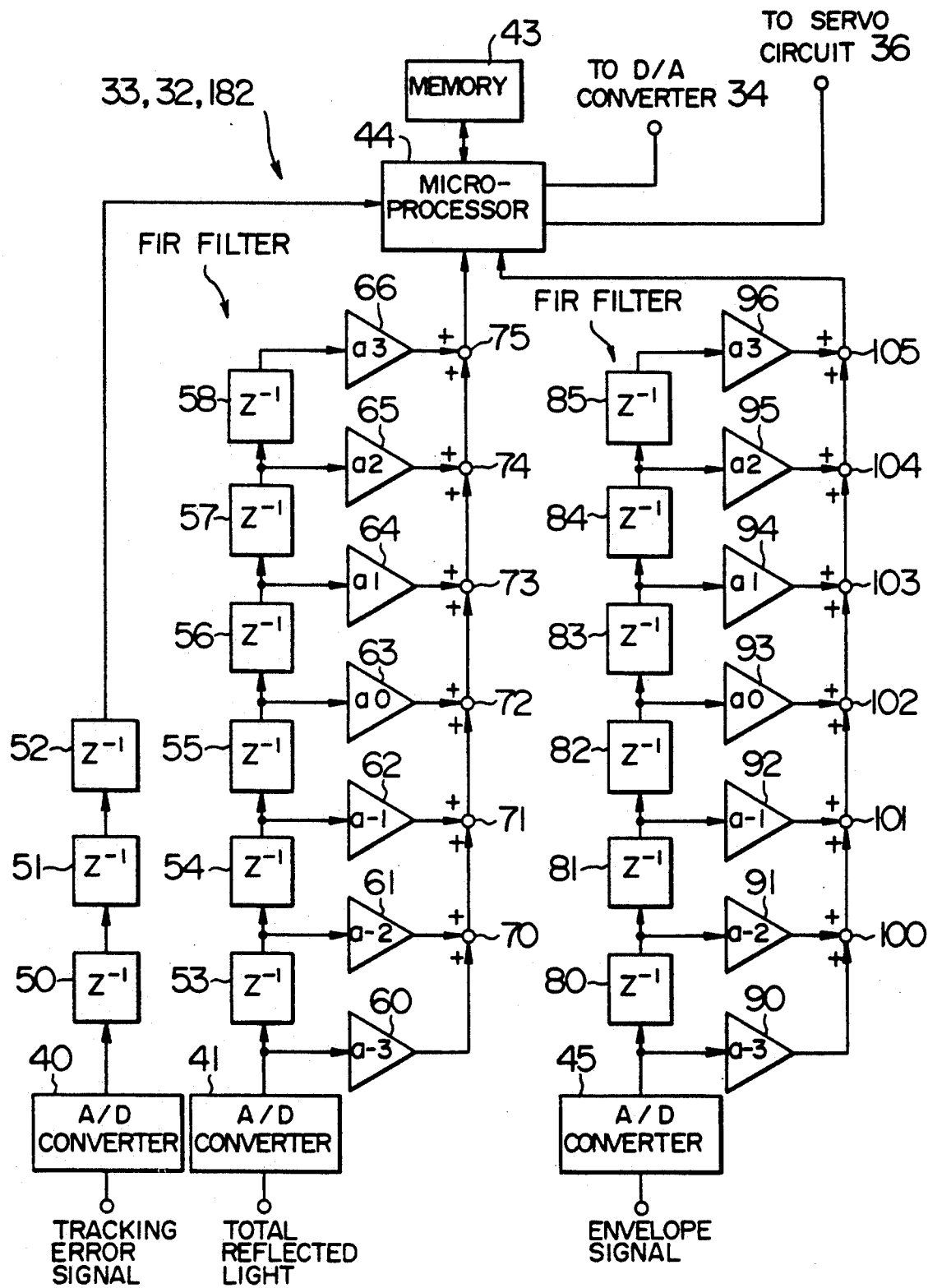

CONTROL APPARATUS FOR TRACKNG A LIGHT BEAM ON A TRACK OF AN OPTICAL RECORDING MEDIUM

BACKGROUND OF THE INVENTION

1. Field of the Invention

The present invention relates to a tracking control apparatus suitable for use in an optical recording and reproduction apparatus, in which various information, such as code information and video/audio information, is recorded on and reproduced from a recording medium capable of recording and erasing information optically.

2. Description of the Related Art

An optical recording and reproduction apparatus has hitherto been used, in which a light beam emitted from a light source such as a semiconductor laser diode is focused on a recording medium of a disk rotating at a predetermined speed to record or reproduce a signal. An information recording and reproducing track having a width of 1.2 $\mu$m is arranged on the recording medium in the form of concentric circles or a spiral, with a pitch of 1.6 $\mu$m.

In order to record a signal on the track or reproduce the signal from the track, it is necessary to carry out focusing control for focusing the light beam on the recording medium so that a light spot having a diameter less than 1 $\mu$m is formed on the recording medium, and to perform tracking control for causing the light spot to follow the track.

A tracking control system includes a photodetector for detecting a tracking error signal from the light which has been reflected from the track or has passed through the recording medium when the light beam is incident on the track and subjected to diffraction by the track, circuit means for carrying out phase compensation for the detected tracking error signal, and an actuator for driving an objective lens or galvanomirror so that the light spot is moved in a direction perpendicular to the track.

In a conventional tracking control apparatus, focusing servo control is first carried out. After a focusing servo mechanism has begun to operate stably, a tracking error signal is detected from a tracking guide groove previously provided on the disk, and maximum and minimum values of the tracking error signal are detected. Then, the position adjustment of the tracking servo is effected by giving an offset to the tracking servo control signal so that the tracking position coincides with the middle point between a position indicated by the maximum value and a position indicated by the minimum value.

As mentioned above, in the conventional tracking control apparatus, the middle point between the position indicated by the maximum value of a tracking error signal and the position indicated by the minimum value of the tracking error signal is used as a tracking position. In a tracking error signal detection method according to the far field method, which detection method is used in a large number of optical recording and reproducing apparatuses, however, there arises a problem that an offset is produced by the tracking error signal when the optical axis of the reflected light from the disk deviates from a predetermined direction. Thus, when the optical axis of the reflected light deviates from the predetermined direction on the basis of the shifting of the objective lens or the tilt of the disk, it is impossible to determine a correct tracking position.

SUMMARY OF THE INVENTION

It is an object of the present invention to provide a tracking error signal detection system which does not produce any offset in tracking servo control even when the optical axis of light reflected from an optical disk deviates from a proper direction due to the shift of an objective lens or the tilt of the optical disk. It should be noted that the total reflected light from the land center of a track has a maximum value and the total reflected light from the groove center of a track has a minimum value, even when the optical axis of light reflected from the track deviates from a proper direction. In view of the above fact, a tracking control apparatus according to the present invention comprises means for detecting a tracking error signal which indicates a positional deviation of a light spot formed by focusing a light beam on an optical recording medium from an information recording and reproducing track having a tracking guide groove, means for detecting total reflected light from a portion of the optical recording medium which is irradiated by the light spot, means for detecting an extremum of the total reflected light, and means for changing a desired value for tracking servo control, thereby changing the desired value for the tracking servo control by an amount corresponding to the tracking error signal at a time when the total reflected light is at the extremum. Thus, according to the present invention, a tracking error signal, which does not produce any offset, is detected even when the optical axis of light reflected from the optical recording medium deviates from a proper direction.

BRIEF DESCRIPTION OF THE DRAWINGS

FIG. 3 is a block diagram showing a first embodiment of a tracking control apparatus according to the present invention.

FIG. 15 is a circuit diagram showing a concrete circuit arrangement of the extremum detector and the maximum point detector in the second embodiment.

DESCRIPTION OF THE PREFERRED EMBODIMENTS

Figure 1:
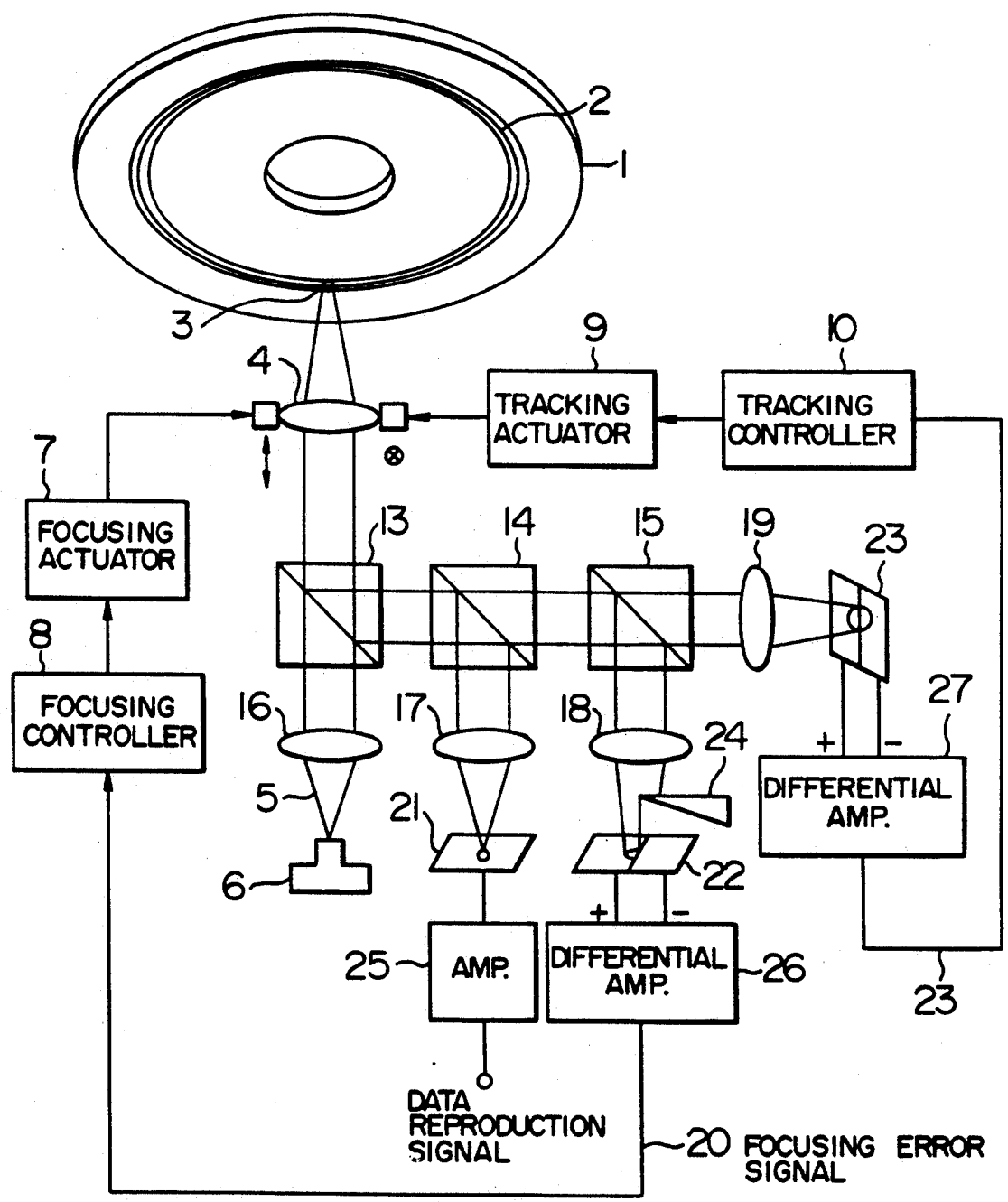
FIG. 1 is a diagram showing the construction of a conventional optical recording and reproducing apparatus.

In a conventional, optical recording and reproduction apparatus, as shown in FIG. 1, an information recording and reproducing track 2 is formed on an optical disk 1, and a light beam 5 emitted from a laser diode 6 is focused on the optical disk 1. In more detail, the light beam 5 is converted by a collimator lens 16 into parallel rays, which pass through a half mirror 13 and are then focused on the optical disk 1 by an objective lens 4, so that a fine light spot 3 is formed on the optical disk 1. The reflected light from the optical disk 1 passes through the objective lens 4, and a portion of the transmitted light from the objective lens 4 is reflected from the half mirror 13, to be divided by a half mirror 14 into two parts (that is, reflected light and transmitted light). The reflected light from the half mirror 14 passes through a coupling lens 17, and is then converted into an electrical, reproduced signal by a photodetector 21 and a reproduction amplifier 25. The transmitted light from the half mirror 14 is divided by a half mirror 15 into two parts (that is, reflected light and transmitted light). The reflected light from the half mirror 15 passes through a coupling lens 18 and is then incident on a divided photodetector 22 in such a manner that a portion of light passing through the coupling lens 18 is blocked by a knife edge 26. Two outputs from the divided photodetector 22 are applied to a differential amplifier 26, to obtain an electrical, focusing error signal, which is applied to a focusing controller 8. In the focusing controller 8, processing such a phase compensation is carried out for the focusing error signal, to obtain a focusing drive signal. A focusing actuator 7 moves the objective lens 4 in a direction which is substantially perpendicular to the surface of a recording medium of the optical disk 1, in accordance with the focusing drive signal, to carry out focusing control, thereby focusing the light beam 5 exactly on the recording medium of the optical disk 1. The transmitted light from the half mirror 15 passes through a coupling lens 19, and is then incident on a divided photodetector 23. Two outputs from the photodetector 23 are applied to a differential amplifier 27, to obtain an electrical, tracking error signal, which is applied to a tracking controller 10. In the tracking controller 10, processing such as phase compensation is carried out for the tracking error signal, to obtain a tracking drive signal. A tracking actuator 9 moves the objective lens 4 in a direction which is substantially perpendicular to the information recording track 2, in accordance with the tracking drive signal, to carry out tracking servo control, thereby causing the light spot 3 to follow the track 2 accurately. In the above, the focusing control and tracking control in the conventional, optical recording and reproduction apparatus has been explained.

Figure 2:
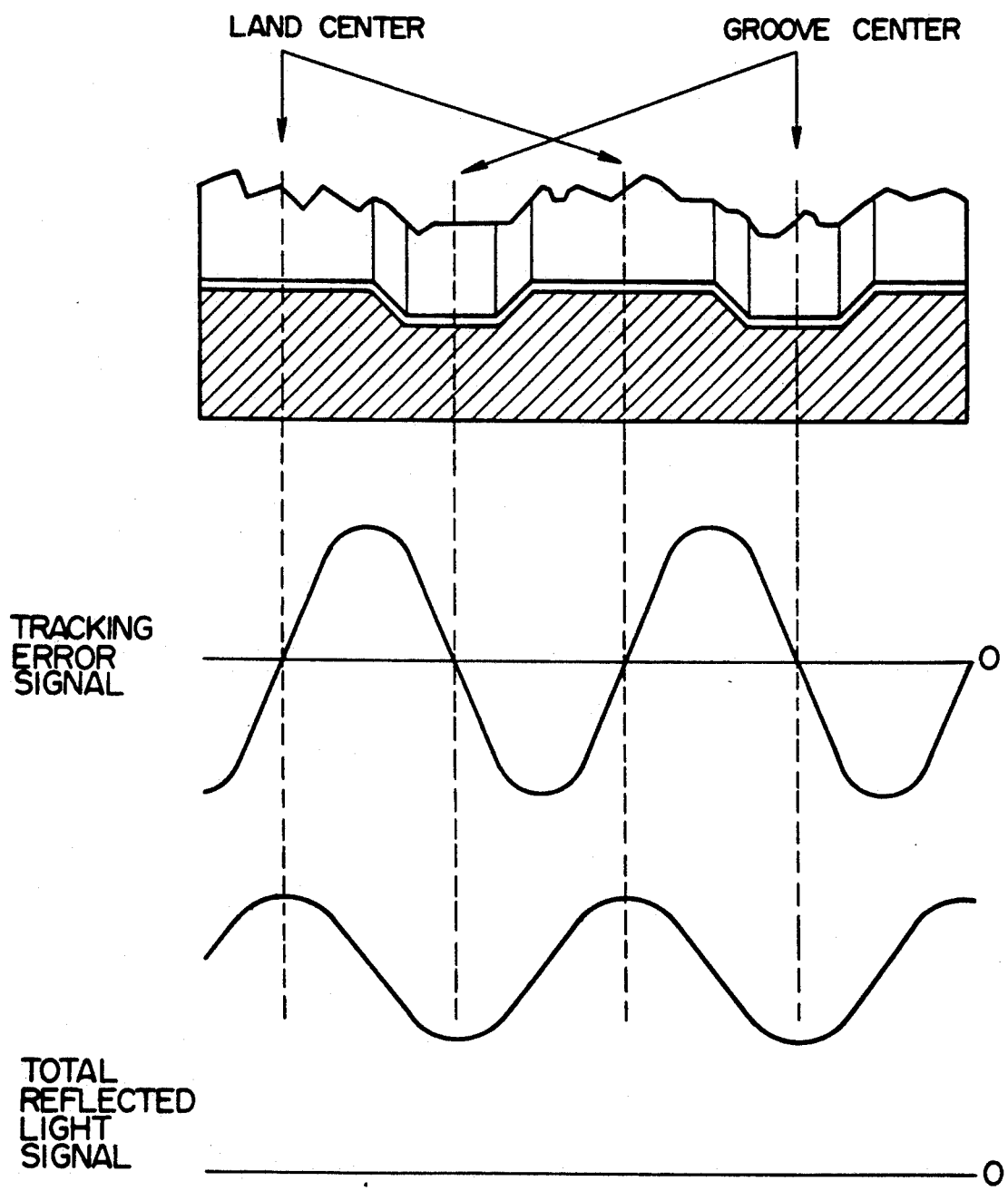
FIG. 2 is an explanatory drawing illustrating the relation between a tracking position indicated in a cross section of an optical disk perpendicular to the information recording and reproducing track and the respective waveforms of a tracking error signal and a total reflected light signal.

Next, an explanation will be made of a relation in the conventional, optical recording and reproduction apparatus among a signal recording track, a tracking error signal, and a total reflected light signal. FIG. 2 shows the relation between the signal recording and reproducing track, the tracking error signal, and the total reflected light signal. The width of a land portion located between two groove portions of the signal recording and reproducing track is greater than that of a groove portion. Accordingly, the quantity of light reflected from the land portion is greater than the quantity of light reflected from the groove portion. Thus, as shown in FIG. 2, when the light spot is placed at the center of the land portion, the total reflected light quantity has a maximum value. When the light spot is placed at the center of the groove portion, the total reflected light quantity has a minimum value. It is to be noted that information is recorded in and reproduced from the land portion or groove portion.

Now, a first embodiment of a tracking control apparatus according to the present invention will be explained below, with reference to the drawings. FIG. 3 is a block diagram showing the first embodiment. In FIG. 3, the optical disk 1, the optical recording track 2, the light spot 3, the objective lens 4, the tracking actuator 9, the coupling lens 19, the divided photodetector 23 and the differential amplifier 27 are the same as those shown in FIG. 1. An optical head 30 shown in FIG. 3 includes the laser diode 6, the half mirrors 13 to 15, the collimator lens 16, the coupling lenses 17 and 18, the photodetector 21, the divided photodetector 22 and the knife edge 24 which are shown in FIG. 1. Referring to FIG. 3, a total reflected light signal is delivered from an additional amplifier 31, to be applied to an extremity detector 32. A timing signal indicating a time an extremum of the total reflected light signal is detected, is sent from the extremum detector 32 to a controller 33. The controller 33 instructs a D/A converter 34 to deliver an analog signal corresponding to a tracking position. The analog signal is applied to a subtractor (for example, differential amplifier) 35. In the subtractor 35, the analog signal from the D/A converter 34 is subtracted from the tracking error signal. The output of the subtractor 35 is applied to a servo circuit 36, the output of which is applied to the tracking actuator 9. Further, a changeover signal for changing one of position control and speed control over to the other control is sent from the controller 33 to the servo circuit 36.

Next, explanation will be made of the actual circuit construction of each of a tracking error signal detector, a total reflected light detector, the subtractor and the servo circuit.

Figure 4:
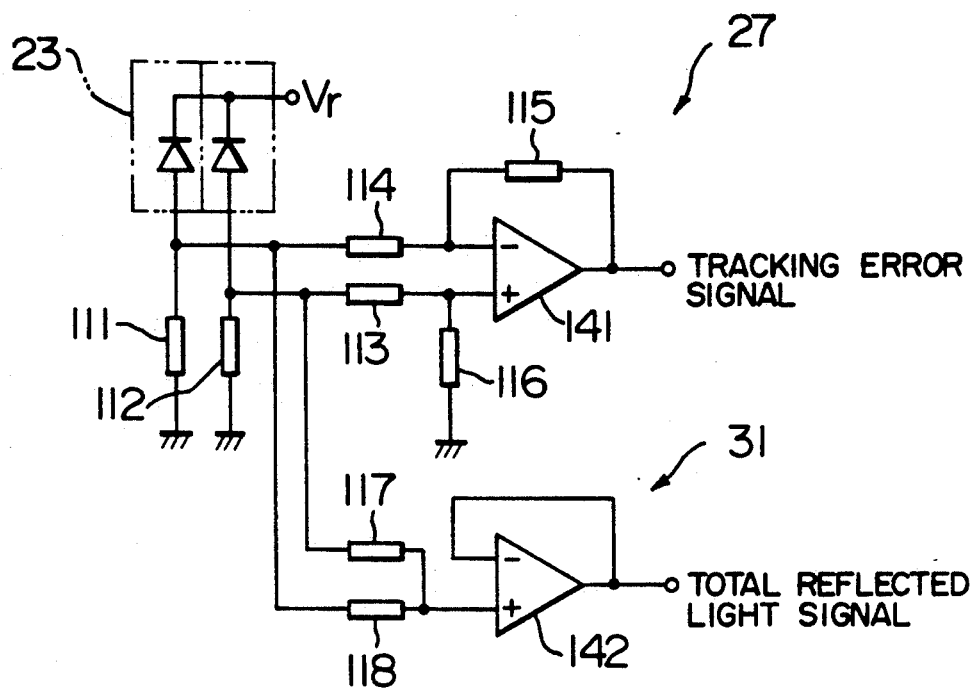
FIG. 4 is a circuit diagram showing the actual circuit construction of a circuit part which includes a tracking error signal detector and a total reflected light signal detector.

FIG. 4 is a circuit diagram showing an actual example of the circuit construction of the tracking error signal detector and total reflected light detector which are made up of the divided photodetector 23, the differential amplifier 27 and the additional amplifier 31. In FIG. 4, reference numerals 141 and 142 designate operational amplifiers, and 111 to 118 resistors. Further, reference characters Vr in FIG. 4 designate a bias voltage applied to the divided photodetector 23. Referring to FIG. 4, two output currents from the divided photodetector 23 are converted by the resistors 111 and 112 into two voltages, and the difference between the voltages is detected by the differential amplifier 27 which is made up of the operational amplifier 141 and the resistors 113 to 116, to obtain the tracking error signal. That is, the differential amplifier 27 delivers the tracking error signal. Further, two voltages from the resistors 111 and 112 are applied to the additional amplifier 31 which is made up of the operational amplifier 142 and the resistors 117 and 118, to obtain the total reflected light signal.

Figure 5:
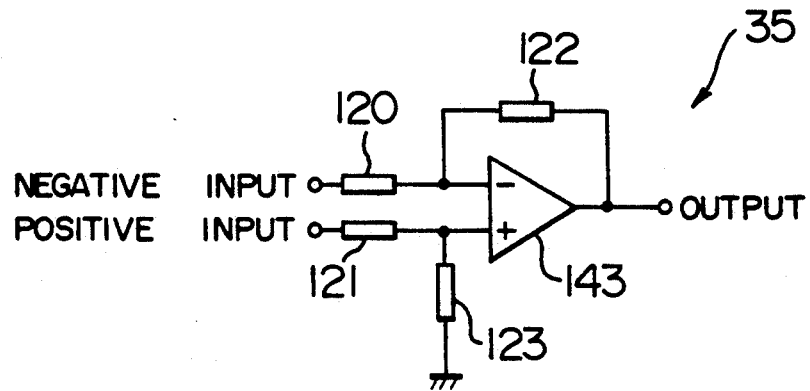
FIG. 5 is a circuit diagram showing the actual circuit construction of a subtraction circuit.

FIG. 5 is a circuit diagram showing the actual circuit construction of the subtractor 35. In FIG. 5, reference numeral 143 designates an operational amplifier, and 120 to 123 resistors.

Figure 6:
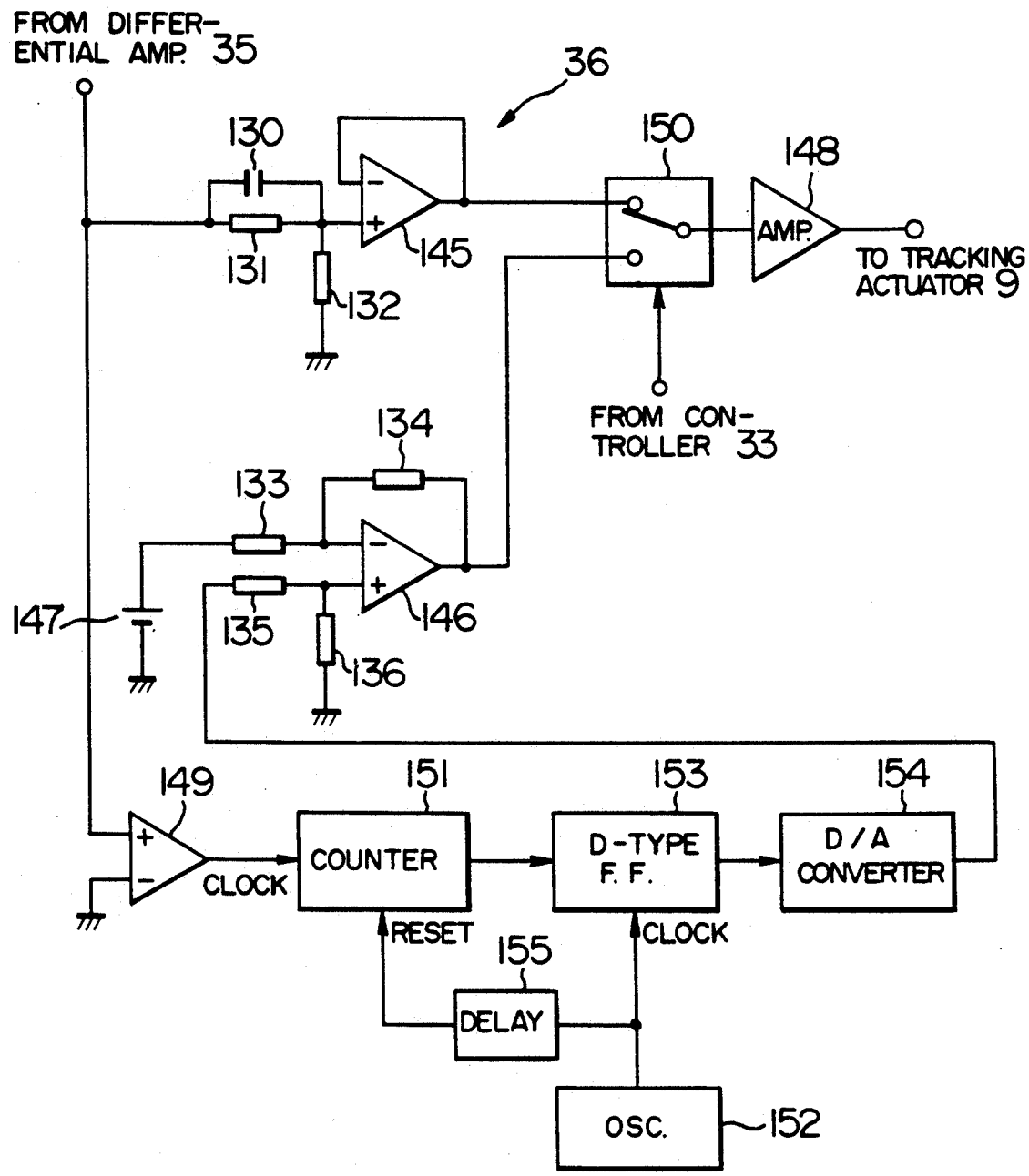
FIG. 6 is a circuit diagram showing the actual circuit construction of a tracking servo circuit.

FIG. 6 shows an actual example of the circuit construction of the servo circuit 36. In FIG. 6, reference numerals 145 and 146 designate operational amplifiers, 131 to 136 resistors, 130 a capacitor, 149 a voltage comparator, 148 a power amplifier for driving the tracking actuator 9, 150 a switching circuit, 151 a counter having a reset terminal, 152 an oscillator for generating a digital signal, 153 a D-type flip-flop circuit, 154 a D/A converter, 155 a delay circuit, and 147 a reference voltage source. Referring to FIG. 6, a filter which is made up of the operational amplifier 145, the resistors 131 and 132, and the capacitor 130, carries out phase compensation for a corrected tracking error signal which is delivered from the differential amplifier (that is, subtractor) 35 and can eliminate an offset in tracking servo control. The corrected tracking error signal is also applied to the voltage comparator 149, to be converted into a digital signal which is generated each time tracks are traversed by the light spot. The number of tracks traversed by the light spot is counted by the counter 151. A signal having a predetermined frequency is outputted from the oscillator 152 and supplied to the reset terminal of the counter 151 through the delay circuit 155 for delaying an input signal thereto by a very short period of time, and the counter 151 is reset at the leading edge of the output signal of the delay circuit 155 and successively restarts its counting operation from a new zero count. The D-type flip-flop 153 holds the count of the counter 151 before it is reset, at the rise time of the output signal of the oscillator 152, the leading edge of the output of the oscillator 152. Thus, it is possible to count the number of tracking error signals which are generated in a predetermined time. That is, a speed, at which the light spot traverses the tracks, can be detected. The output of the D-type flip-flop circuit 153 is converted by the D/A converter 154 into an analog speed signal. The difference between the speed signal from the D/A converter 154 and the output of the reference voltage source 147 for indicating a reference speed, is detected by a differential amplifier which is made up of the operational amplifier 146 and the resistors 133 to 136. When the output signal of the above differential amplifier is selected by the switching circuit 150, the speed control for making the moving speed of the light spot constant, is carried out.

Next, explanation will be made of a method of detecting an extremum of the total reflected light. An extremum of the total reflected light can be detected by detecting a maximum point of the total reflected light signal, or by differentiating the total reflected light signal. An extremum detection method will be explained which uses a phase shifter for shifting the phase of a signal by an angle of about 90°.

Figure 7:
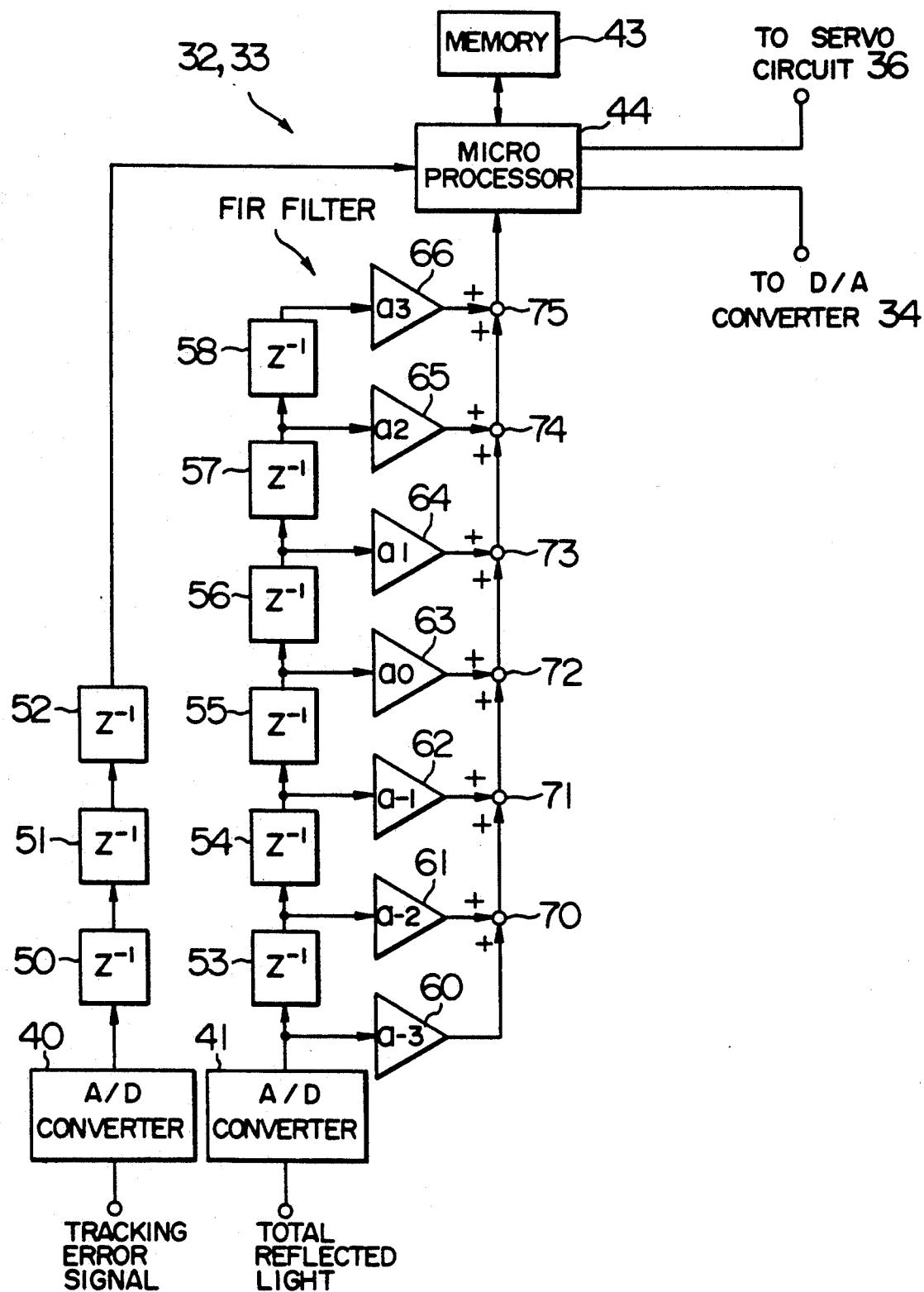
FIG. 7 is a circuit diagram showing the actual circuit construction of the extremum detector included in the first embodiment of FIG. 3.

FIG. 7 shows an actual example of a circuit part which includes the extremum detector 32 which uses a phase shifter, and the controller 33. This circuit part includes a microprocessor. In FIG. 7, reference numerals 40 and 41 designate A/D converters, 43 a memory, 44 a microprocessor, 50 to 58 unit-time delay circuits for delaying an input signal by a unit time, 60 to 66 multipliers, and 70 to 75 adders. A part of the function of each of the controller 33 and the extremum detector 32 is performed by the microprocessor 44. The transfer function H(z) of a finite impulse response filter (namely, FIR filter) which is made up of the unit-time delay circuits 53 to 58, the multipliers 60 to 66, and the adders 70 to 75, is given by the following equation:

$$H(z) = \sum_{i=-n}^{n} a_i \cdot z^{i+n}$$

where n=3, namely, the time point of t=0 is set to a time point which is delayed by three unit delay time periods.

When the above coefficient $a_i$ is given by the following equation:

$$a_i = \begin{cases} 1/i & \text{for } i \neq 0 \\ 0 & \text{for } i = 0 \end{cases}$$

a phase shifter is obtained in which an output signal lags an input signal by an angle of 90° in the frequency range between zero and 1/(2Ts), where Ts indicates a sampling time. When the coefficient $A_i$ is made equal to $-1/i$ for $i \neq 0$, a phase shifter is obtained, in which an output signal leads an output signal by an angle of 90°. In general, when the coefficients $a_{+i}$ and $a_{-i}$ are made symmetrical with respect to the coefficient $a_0$, an FIR filter is formed, in which the phase of an input signal is shifted by an angle of 90° or −90°.

Further, in a case where the coefficient $a_i$ is made equal to zero for i indicated by an even number, the gain characteristic of FIR filter is made fat. In a case where the coefficients $a_{-i}$ are all made equal to 1 and the coefficients $a_{+i}$ are all made equal to −1 (where $i \neq 0$), or in a case where the coefficients $a_{-i}$ are all made equal to −1 and the coefficients $a_{+i}$ are all made equal to +1 (where $i \neq 0$), an FIR filter for shifting the phase of an input signal by an angle of 90° can be obtained without carrying out multiplication, though the frequency vs. gain characteristic of the FIR filter is not flat.

Figure 8:
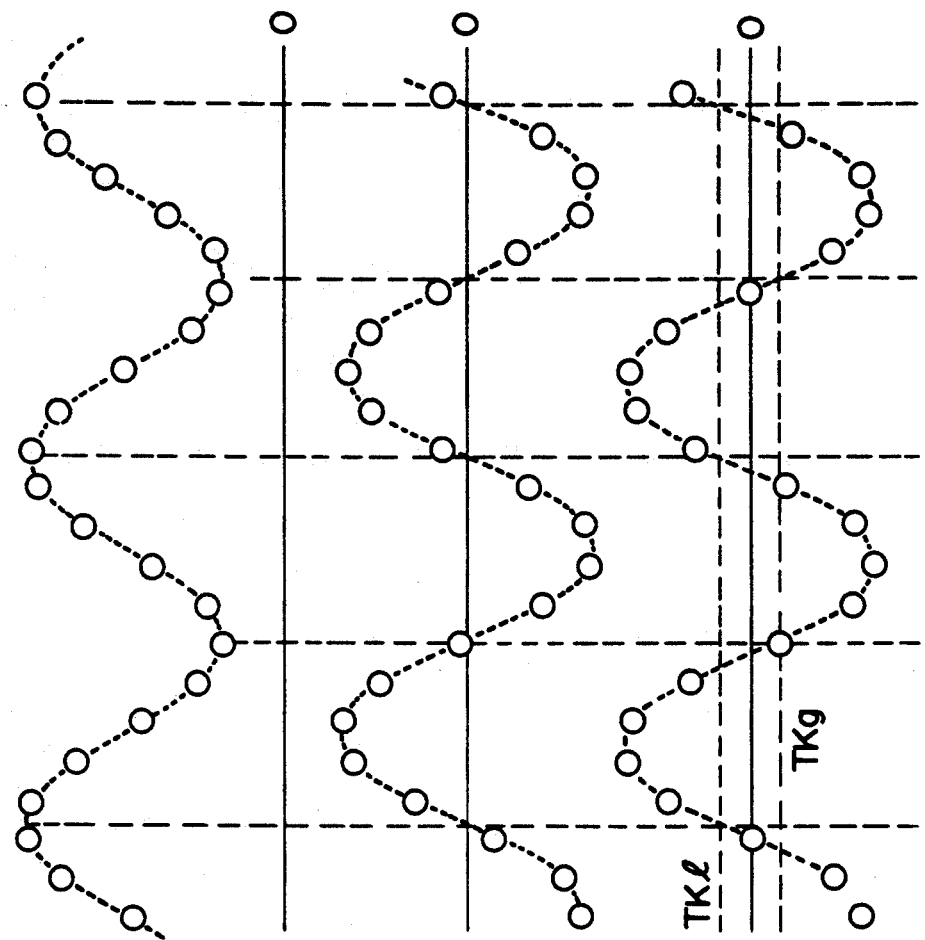
FIGS. 8A to 8C are waveform charts showing the phase relation among a total reflected light signal, the total reflected light signal shifted in phase, and a tracking error signal.

The operation of the extremum detector using the above phase shifter will be explained below, with reference to FIGS. 8A to 8C. It is to be noted that each of signals shown in FIGS. 8A to 8C is a digital signal which is obtained after A/D conversion, and a symbol ○ in FIGS. 8A to 8C indicates signal values sampled at intervals of a predetermined time. FIG. 8A shows a total reflected light signal. When the phase of the total reflected light signal shown in FIG. 8A is advanced by an angle of 90° and a D.C. component is removed from the total reflected light signal by means of the above phase shifter, a transformed, total reflected light signal is obtained as shown in FIG. 8B. As is apparent from FIGS. 8A and 8B, the maximum value of the total reflected light signal corresponds to that zero-crossing point of the transformed, total reflected light signal where a signal value changes from a negative value to a positive value, and the minimum value of the total reflected light signal corresponds to that zero-crossing point of the transformed, total reflected light signal where a signal value changes from a positive value to a negative value. The signal value of the total reflected light signal varies gradually in the vicinity of each extremum thereof. Accordingly, it is difficult to detect the extremums of the total reflected light signal accurately. However, by detecting the zero-crossing points of the transformed, total reflected light signal, the accurate extremums of the total reflected light signal can be readily detected. In a case where information is recorded on a land portion of a recording medium, the total reflected light signal has a maximum value when a tracking position is detected. In this case, as shown in FIG. 8C, a value $T_{kl}$ of tracking error signal corresponding to that zerocrossing point of the output signal of the phase shifter where a signal value changes from a negative value to a positive value, indicates a correct tracking position. While, in a case where information is recorded on a groove portion of the recording medium, the total reflected light signal has a minimum value when a tracking position is detected In this case, a value $T_{kg}$ of tracking error signal corresponding to that zero-crossing point of the output signal of the phase shifter where a signal value changes from a positive value to a negative value, indicates a correct tracking position. The phase shifter delays an input signal by one half the total delay time due to the unit-time delay circuits. Accordingly, it is necessary to delay the tracking error by the same amount as mentioned above, thereby making the delay time of the total reflected light signal equal to that of the tracking error signal.

Figure 9:
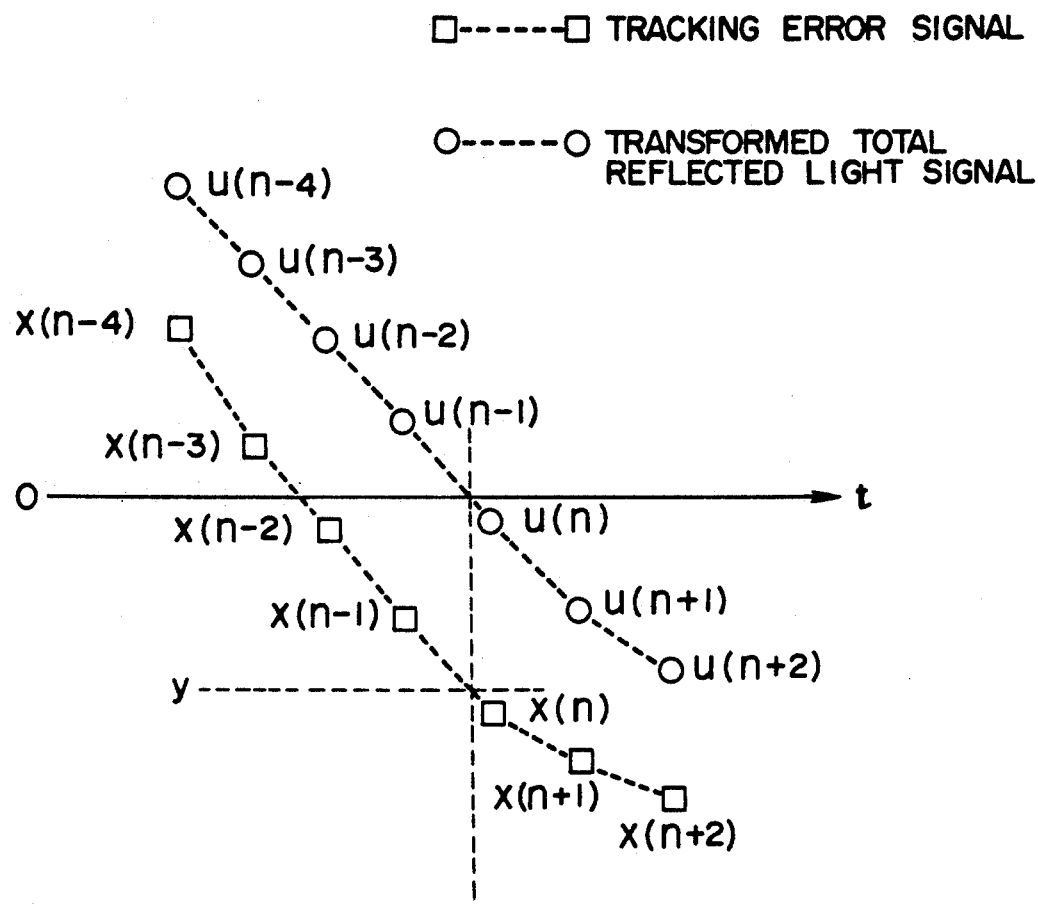
FIG. 9 is a waveform chart showing the waveform of a tracking error signal at a zero-crossing point of the total reflected light signal shifted in phase, and its neighborhood.

Next, explanation will be made of a tracking-position detecting operation according to the present invention. Referring back to FIG. 3, in a state that focusing servo control is being carried out, the controller 33 instructs the servo circuit 36 to set the switching circuit 150 of FIG. 6 on the speed control side, that is, to set the movable contact of the switching circuit 150 on the low side. Thus, speed control is carried out so that a detected speed becomes equal to a reference speed indicated by the output voltage of the reference voltage source 147. Hence, the light spot moves at a substantially constant speed. The controller 33 takes in the tracking error signal which is delivered from the differential amplifier 27 and is digitized by the A/D converter 40, and the output signal of the extremum detector 32 formed of the phase shifter, to calculate a tracking position at a time the zero-crossing point of the output signal of the extremum detector is detected. This calculation will be explained, with reference to FIG. 9. In FIG. 9, reference character u designates a value of the output signal of the phase shifter, and x a value of the tracking error signal. A zero-crossing point of the output signal of the phase shifter exists between signal values $u(n-1)$ and $u(n)$. When the above zero-crossing point is detected, the controller 33 calculates a tracking position signal y which is given by the following equation:

$$y = \{u(n)x(n-1) + u(n-1)x(n)\}/\{u(n-1)+u(n)\}$$

In more detail, in a case where information is recorded on the land portion of the recording medium, the tracking position signal y is calculated when that zero-crossing point of the output signal of the phase shifter where a signal value u changes from a negative value to a positive value, is detected. While, in a case where information is recorded on the groove portion of the recording medium, the tracking position signal y is calculated when that zero-crossing point of the output signal of the phase shifter where a signal value u changes from a positive value to a negative value, is detected. According to this calculation method, even when the signal values u and x deviate from each other in time, a value of tracking error signal corresponding to a zero-crossing point of the output signal of the phase shifter, can be calculated in a manner similar to the above-mentioned, by taking the time deviation into consideration. The value of y calculated from the above equation indicates a tracking position. The tracking position signal indicating the tracking position is converted by the D/A converter 34 of FIG. 3 into an analog signal, which is subtracted from the tracking error signal by means of the differential amplifier 35. Further, the switching circuit 150 of FIG. 6 is set on the position control side, that is, the movable contact of the switching circuit 150 is set on the upper side. Thus, an offset is removed from the tracking error signal, and tracking control is carried out so that the light spot is placed at the correct tracking position.

When a plurality of tracking positions are determined by calculation while moving the light spot, and the mean value of the tracking positions is used as a desired tracking position, the desired tracking position is determined with satisfactory accuracy.

Figure 10:
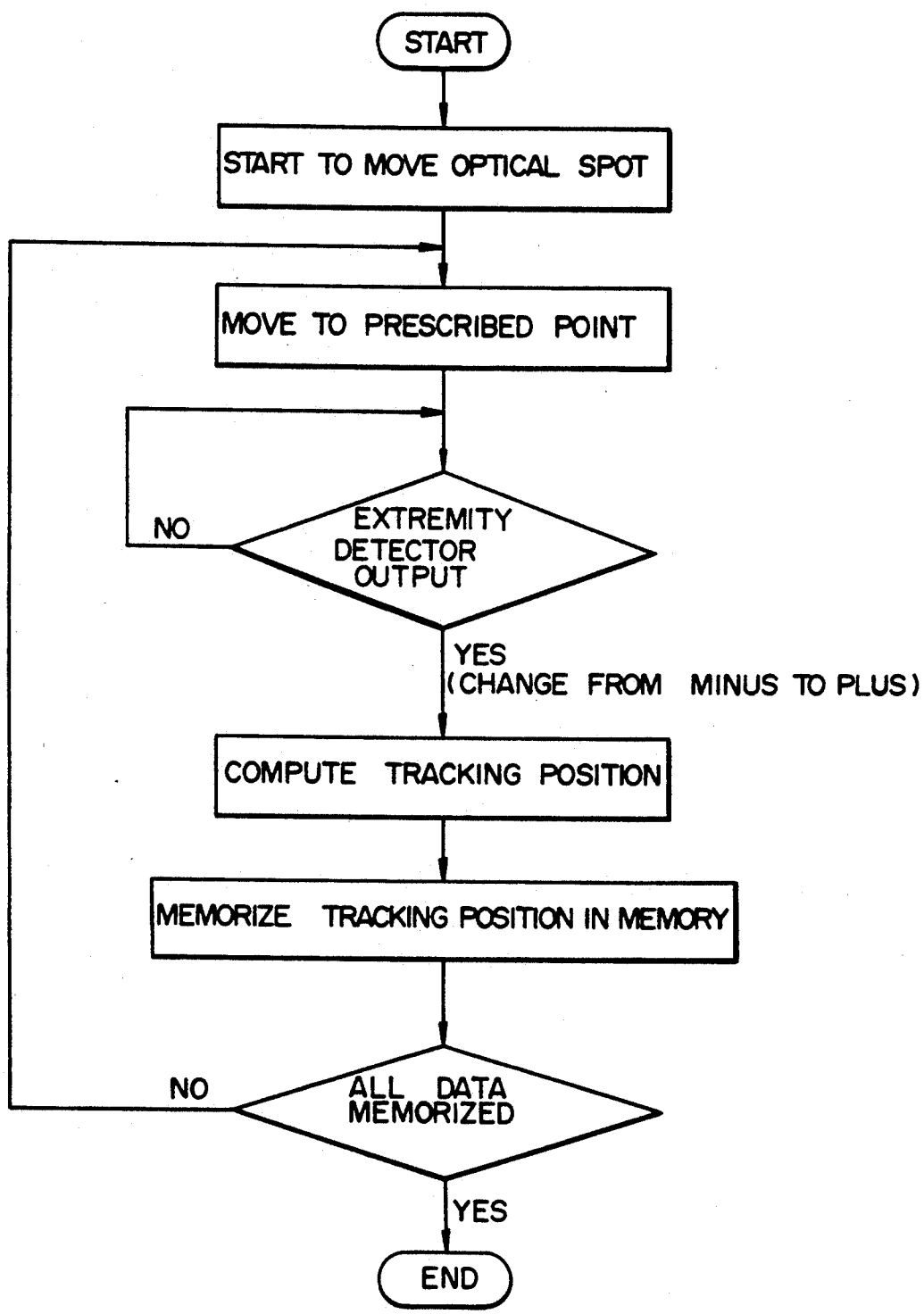
FIG. 10 is a flow chart showing the operation of the first embodiment of FIG. 3.
Figure 11:
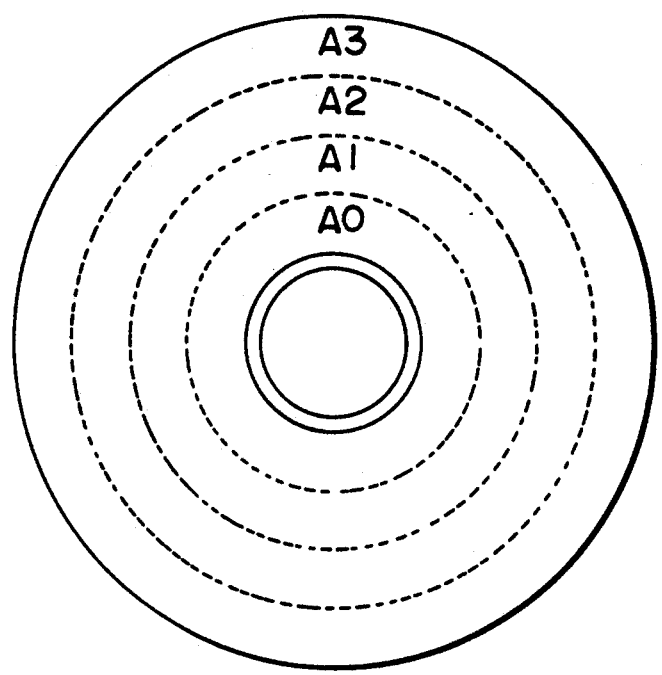
FIG. 11 is a schematic diagram showing an example of an optical disk divided into a plurality of regions.

The change of a tracking position on the optical disk increases as the diameter of the optical disk is larger. In order to carry out tracking servo control having no offset all over the surface of the optical disk, it is necessary to determine a tracking position signal at each of a plurality of positions on the optical disk. Accordingly, the surface of the optical disk is divided into a plurality of areas, and a tracking position is determined at each area, to be stored in a memory. Further, the tracking error signal is corrected by each of values indicative of the tracking positions stored in the memory. Thus, tracking servo control having no offset is carried out all over the surface of the optical disk. The above processing will be explained below in detail, with reference to FIGS. 10 and 11. FIG. 10 is a flow chart for explaining the determination and storage of tracking positions, and FIG. 11 shows a case where the surface of the optical disk is divided into concentric areas A0, A1, A2 and A3.

First, the controller 33 of FIG. 3 instructs the servo circuit 36 to set the movable contact of the switching circuit 150 of FIG. 6 on the low side. Thus, speed control for moving the light spot at a constant speed is carried out. When the light spot reaches the area A0, the controller 33 calculates a tracking position from the output signal of the extremum detector 32 and the tracking error signal in a period when the light spot moved in the area A0 at the constant speed, and stores the tracking position in a memory at an address corresponding to the area A0. Next, the light spot is moved to the area A1, and a tracking position is detected in a period when the light spot moves in the area A1 at the constant speed, to be stored in the memory at an address corresponding to the area A1. Such an operation is repeated for each of the areas A2 and A3. The above processings are shown by the steps shown in FIG. 10. In order to perform information recording, reproducing and erasing operations for the optical disk, a desired tracking position signal is read out from an address of a desired tracking position storage means corresponding to a region of the optical disk, and an indication is given to a desired tracking position signal generator to cause it output a desired tracking position signal. Then, the desired tracking position signal thus outputted is subtracted from a tracking error signal, and this subtraction result is supplied to the servo circuit 36 to thereby drive the tracking actuator 9.

Further, if a plurality of desired tracking positions are detected in the same area and a mean value of the desired tracking positions is used as a desired tracking position, the precision of detection of a desired tracking position can be elevated.

Figure 12:
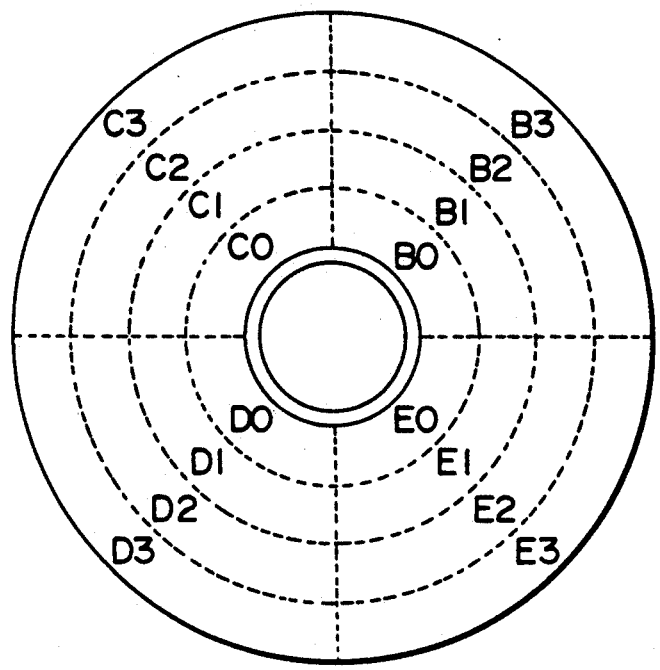
FIG. 12 is a schematic diagram showing another example of an optical disk divided into a plurality of regions.

The surface of the optical disk may be divided into sector-shaped areas. FIG. 12 shows a case where the surface of the optical disk is divided into four concentric areas, and is further divided into four sector-shaped areas, so that sixteen areas B0, B1, B2, B3; C0, C1, C2, C3; D1, D2, D3, D4; E1, E2, E3, E4 are formed. It is to be noted that the present invention is not limited by the shape or number of the areas on the surface of the optical disk.

The tilt of the optical disk and the desired tracking position are dependent upon the mounting state of the optical disk. When an operation for detecting and storing a desired tracking position is performed immediately after the optical disk has been mounted on a supporting member, a desired tracking position corresponding to the mounting state of the optical disk can be detected.

Further, when a desired tracking position is detected in the course of performing a seeking operation, a desired tracking position is obtained without being affected by a change of a desired tracking position due to a variation of the mounting state of the optical disk with time and so on.

Next, an explanation will be made of a method of approximating a tracking position which corresponds to an area of the optical disk by using a function, and storing the function in a memory. First, the controller 33 in FIG. 3 instructs the servo circuit 36 to carry out speed control so that the light spot moves to the area A0 and moves in the area A0 at a constant speed. The controller 33 calculates a desired tracking position from an output signal of the extremum detector 32 and a tracking error signal while the light spot moves in the area A0 at the constant speed. Next, the light spot is moved to the area A1, and a desired tracking position is determined while the light spot moves in the area A1 at the constant speed. Further, such an operation is repeated at each of the areas A2 and A3. In a case where the tilt of the recording medium of the optical disk varies depending on a position on the optical disk, a desired tracking position varies linearly or nonlinearly with a position on the optical disk. In this case, the value of a desired tracking position is approximated by using a linear function, a quadratic function or a higher-order function (when higher approximation accuracy is needed) and the coefficients of the function are calculated and stored in a desired tracking position storing memory. The approximation by using a function is made by the method of least square error. In a case where an information recording, reproducing, or erasing operation is performed, a desired tracking position corresponding to a region of the optical disk stored in the desired tracking position storing memory is calculated by using a predetermined function and coefficients which are stored. Then, the controller 33 instructs the desired tracking position signal generator 34 to have the desired tracking position signal subtracted from the tracking error signal thereby to carry out tracking servo control, whereby the information recording, reproducing, and erasing operation is performed. The tilt of the recording medium of the optical disk varies greatly in a radial direction of the optical disk. Accordingly, a linear function with respect to the radial direction of the optical disk may be used to make approximation of the value of the desired tracking position. If a quadratic function with respect to both the radial and circumferential directions of the optical disk is used to make approximation of the value of the desired tracking position, the degree of approximation is greatly improved.

Further, if the desired tracking position is detected plural times in a same region and a mean value of a plurality of desired tracking positions thus detected is used, it is possible to improve the accuracy of detection of the desired tracking position.

Further, the recording of the optical disk may be divided into sector-shaped recording areas. FIG. 12 shows a surface which is divided into four concentric areas and is further divided into four sector-shaped areas, that is, a surface divided into sixteen areas B0, B1, B2, B3; C0, C1, C2, C3; D0, D1, D2, D3; E0, E1, E2, E3. It is to be noted that the present invention is not limited by the shape or number of areas of the surface of the optical disk.

The tilt of the optical disk and the desired tracking position are dependent on the mounting state of the optical disk. Therefore, if the detection and storage of the desired tracking position is performed immediately after the optical disk has been mounted on a support, an appropriate desired tracking position corresponding to the mounting state of the optical disk can be detected.

Further, when a desired tracking position is detected in the course of a seeking operation, a desired tracking position is obtained without being affected by a change of a desired tracking position due to a variation of the mounting state of the optical disk with time and so forth.

Figure 13:
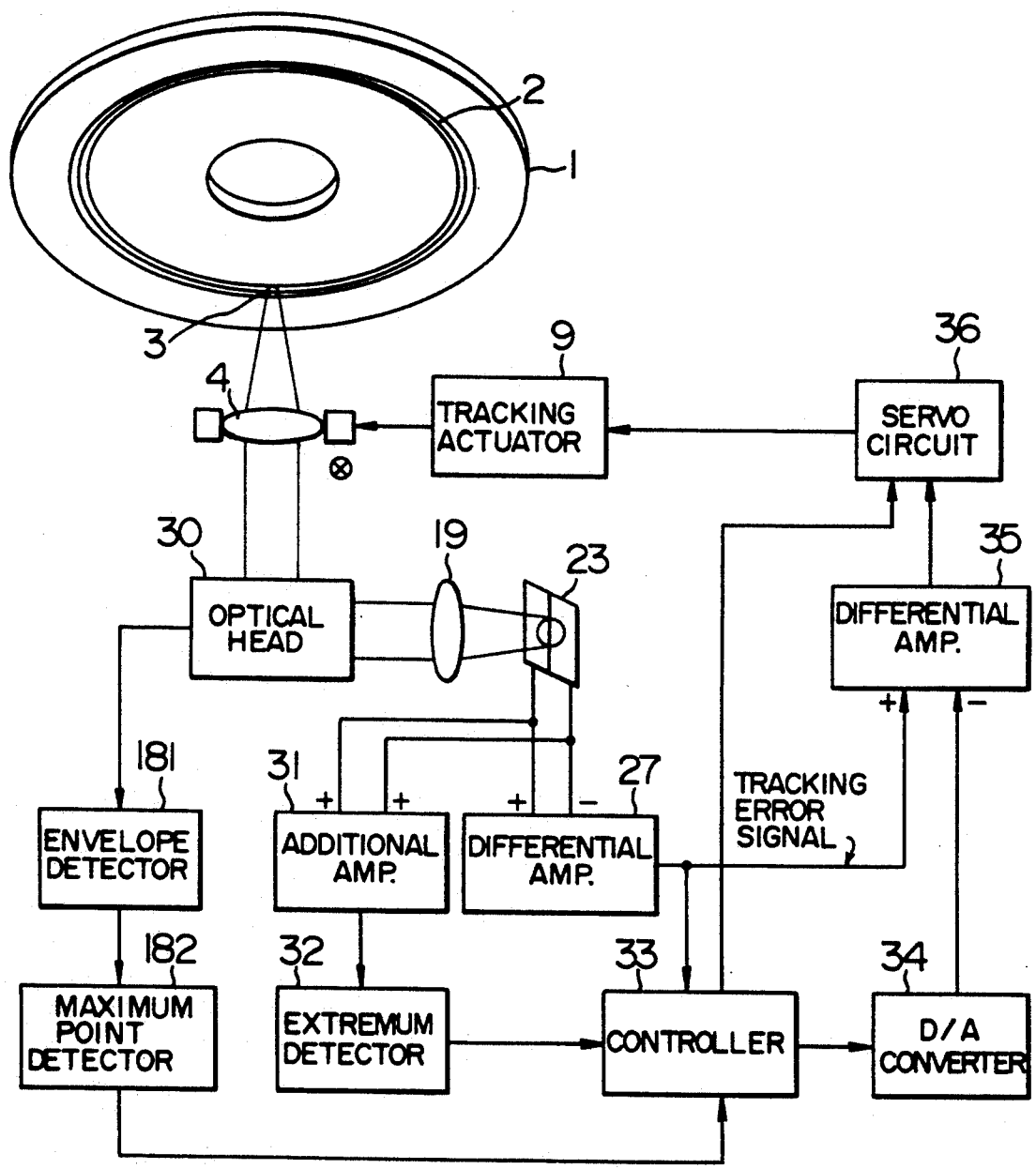
FIG. 13 is a block diagram showing a second embodiment of a tracking control apparatus according to the present invention.

Next, a second embodiment of a tracking control apparatus according to the present invention will be explained with reference to FIGS. 13 to 16. FIG. 13 is a block diagram showing the second embodiment. In FIG. 13, reference numeral 81 designates an envelope detector for detecting an envelope (that is, an amplitude) of a reproduced information signal, and 82 a maximum point detector. Further, in FIG. 13, the optical disk 1, the information recording and reproducing track 2, the light spot 3, the objective lens 4, the tracking actuator 9, the coupling lens 19, the divided photodetector 23, the differential amplifier 27 and the optical head 30 are the same as those shown in FIG. 3.

Referring to FIG. 13, the total reflected light signal obtained by the additional amplifier 31, which is an adder, is applied to the extremum detector 32, and a timing signal indicative of a time when an extremum of the total reflected light signal is detected is applied to the controller 33. While, the reproduced information signal from the optical head 30 is applied to the envelope detector 81 for detecting the envelope of an input signal, and the output of the envelope detector 81 is applied to the maximum point detector, which outputs a timing signal indicative of a time when the maximum point of the envelope is detected. An output of the extremum detector 32 and an output of the maximum point detector 82 are applied to the controller 33, which instructs the D/A converter 34 to produce an analog signal corresponding to a tracking position. The output of the D/A converter 34 is substracted from the tracking error signal through the subtractor (the differential amplifier) 35, and the output of the subtractor 35 is applied to the servo circuit 36, an output of which is applied to the tracking actuator 9. Further, the servo circuit 36 responds to the command from the controller 33 and effects switching between the speed control and the position control.

Figure 14:
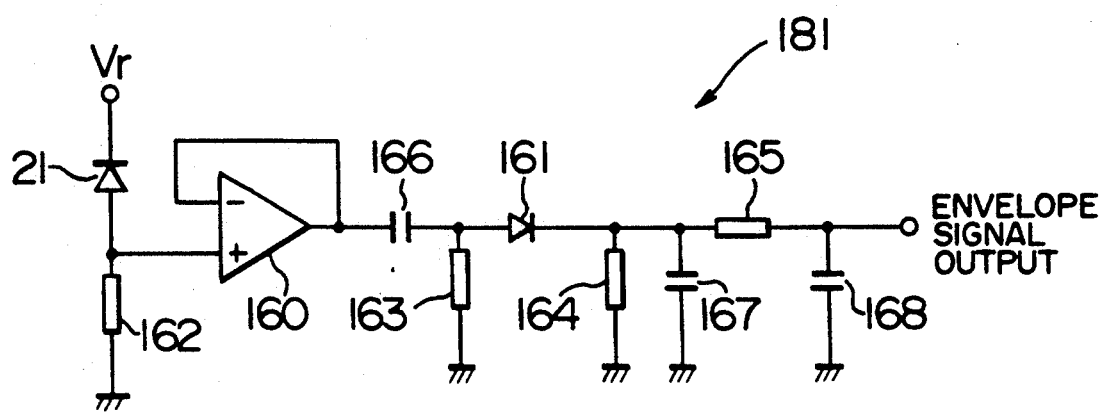
FIG. 14 is a circuit diagram showing the actual circuit construction of an envelope detector for detecting the envelope of an information signal.

Next, the circuit construction of the envelope detector 81 will be explained with reference to FIG. 14. Referring to FIG. 14, an information signal supplied to the photodetector 21 is converted to a current signal, which is converted into a voltage signal through a resistor 162 and an operational amplifier 160. The D.C. component of the voltage signal is removed by a capacitor 166, and a resistor 163. Then, a diode 161 and a parallel circuit of a resistor 164 and a diode 161 operate to hold peak values of the voltage signal. The resistor 165 and the capacitor 168 operate to remove the high-frequency component of the voltage signal and to produce the envelope signal of the information signal.

FIG. 15 shows an example of the concrete circuit arrangement including the extremum detector 32 using a phase shifter, the maximum point detector 82 using a phase shifter, and the controller 33. This example shows a circuit arrangement using a microprocessor. In FIG. 15, the A/D converters 40 and 41, the memory 43, the microprocessor 44, the unit-time delay circuits 50 to 58, the multipliers 60 to 66, and the adders 70 to 75 are the same as those shown in FIG. 7. Further, in FIG. 15, reference numeral 45 designates an A/D converter, 80 to 85 unit-time delay circuits, 90 to 96 multipliers, and 100 to 105 adders. The microprocessor 44 has the function of each of the controller 33, the extremum detector 32 and the maximum point detector 82. The characteristic of an FIR filter, which is composed of the unit-time delay circuits 80 to 85, the multipliers 90 to 96 and the adders 100 to 105, is substantially identical with the characteristic of the FIR filter which is composed of the unit-time delay circuits 53 to 58, the multipliers 60 to 66 and the adders 70 to 75 and shifts the phase of an input signal by an angle of 90°. Therefore, the FIR filter, which is composed of the unit-time delay circuits 53 to 58, the multipliers 60 to 66 and the adders 70 to 75, and the FIR filter, which is composed of the unit-time delay circuits 80 to 85, the multipliers 90 to 96 and the adders 100 to 105, may be used in common by changing the input part thereto.

Figure 16:
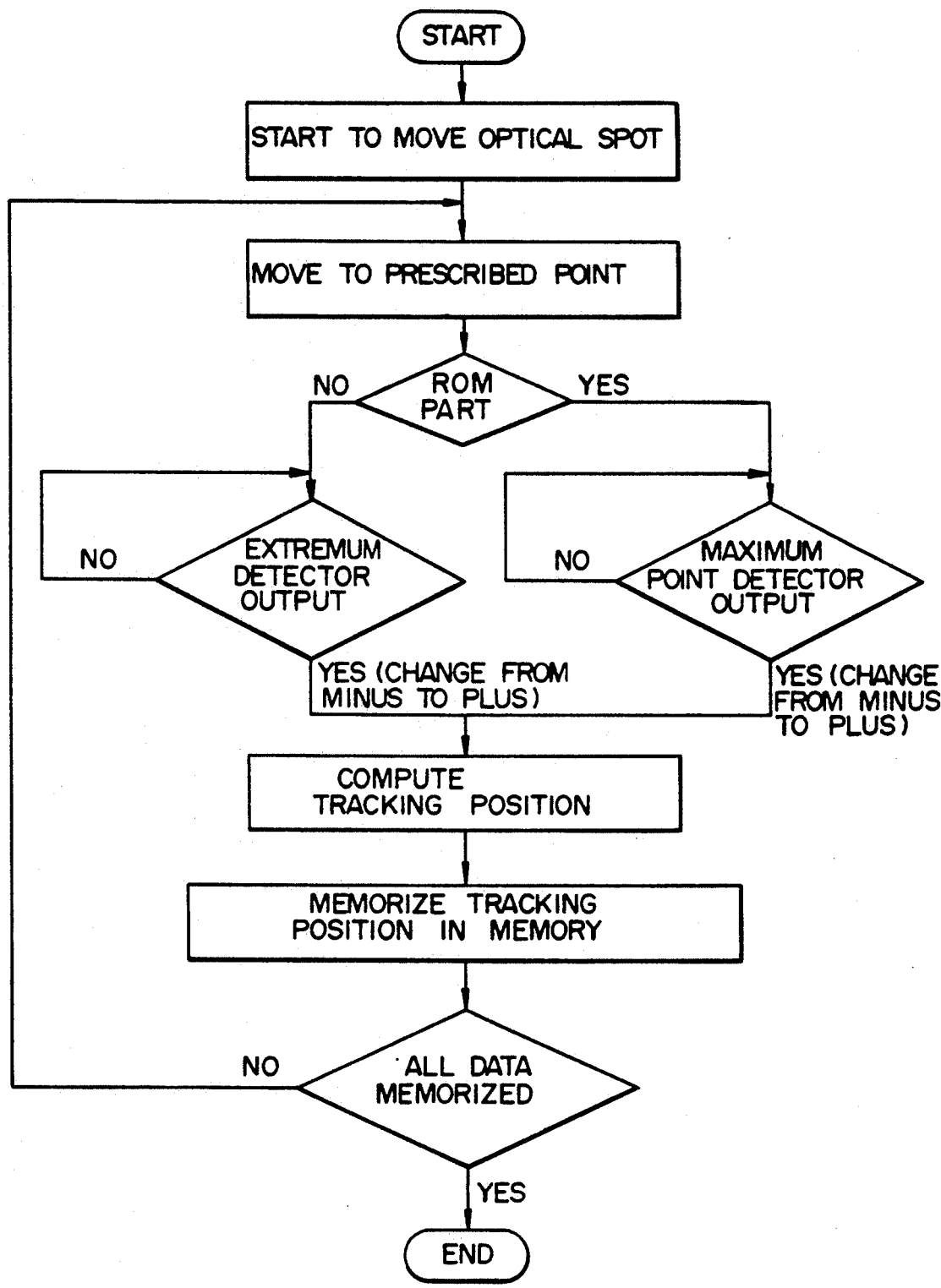
FIG. 16 is a flow chart showing the operation of the second embodiment shown in FIG. 13.

The operation of the second embodiment shown in FIG. 13 will be explained, with reference to FIG. 16. First, the controller 33 instructs the servo circuit 36 to set the switching circuit 150 shown in FIG. 6 to the speed control side, that is, to switch a movable contact of the switching circuit 150 to the lower side. Thus, the speed control is carried out so that a detected speed becomes equal to a reference speed indicated by the output voltage of the reference voltage source 147, and then the light spot moves at a substantially constant speed. First, the light spot is moved to an information recording and reproducing region of the optical disk. The controller 33 takes in a digitized tracking error signal, which has been outputted from the differential amplifier 27, and an output signal of the extremum detector 32 formed of a phase shifter, and the controller 33 calculates a tracking position at a time when the zero-crossing of an output signal of the extremum detector 32 is detected. The above-mentioned calculation of the tracking position is carried out in the same manner as the first embodiment. Next, the light spot is moved to an ROM region of the optical disk. The controller 33 takes in a digitized tracking error signal, which has been outputted from the differential amplifier 27, and an output signal of the maximum point detector 82 formed of a phase shifter, and calculates a tracking position at a time when the zero-crossing of an output signal of the phase shifter is detected. The above-mentioned calculation of the tracking position is carried out in a manner similar to the calculation method of the first embodiment. A value indicative of the tracking position thus obtained is converted by the D/A converter 34 to an analog signal, which analog signal is subtracted from the tracking error signal through the differential amplifier 35. Then, the switching circuit 150 is switched to the position control side, that is, the movable contact of the switching circuit 150 is switched to the upper side. Thus, the tracking servo control is carried out with offset removed from the tracking error signal, and the control to follow the proper tracking position can be effected.

When a plurality of tracking positions are determined by calculation while the light spot is made to continue moving, a mean value of the tracking positions is calculated and used as a desired tracking position, whereby the desired tracking position can be determined with elevated accuracy. The change of a tracking position on the optical disk increases as the diameter of the optical disk becomes greater. In order to carry out the tracking servo control with no offset all over the surface of the optical disk, it is necessary to obtain a tracking position signal for each of a plurality of positions on the optical disk. Accordingly, like in the first embodiment, the surface of the optical disk is divided into a plurality of areas, and a tracking position is detected in each divided area and its value is stored in a memory. If the tracking position is corrected in accordance with the values of tracking positions stored in the memory, the tracking servo control with no offset can be carried out all over the surface of the optical disk.

The tilt of the optical disk and the desired tracking position are dependent on the mounting state of the optical disk. If the detection and storage of the desired tracking positions are performed when an optical disk has been mounted on a support, a desired tracking position adapted to the mounting state of the optical disk can be detected.

Further, when a desired tracking position is detected and corrected in the course of performing a seeking operation, a change of the desired tracking position due to a variation of the mounting state of the optical disk with time and so on can be prevented.

As has been explained in the foregoing, according to the present invention, an extremum of the total reflected light is detected to determine a desired tracking position, which makes it possible to perform tracking servo control with no offset. Further, the surface of the recording medium of the optical disk is divided into a plurality of areas, and desired tracking positions are determined for respective divided areas and stored in a memory. When an information recording, reproducing, or erasing operation is performed, tracking servo operation is performed at desired tracking positions read out from the memory which correspond to the positions on the optical disk. Thus, accurate tracking servo control can be carried out. When a desired tracking position corresponding to each of the divided areas of the recording medium of the optical disk is approximated by a function, and coefficients of the function are stored in the memory, the storage capacity of the memory can be reduced. Further, in a region of the recording medium where information has been recorded, tracking servo control is effected in such a manner that the level of reproduced signals becomes highest, whereby accurate tracking servo control can be attained when using a ROM disk or a partial ROM disk.

We claim:

1. A tracking control apparatus comprising:

tracking error signal detection means for detecting a positional deviation of a light spot from an information recording and reproducing track formed on an optical recording medium and producing a tracking error signal representing said positional deviation, the light spot being formed by focusing a light beam emitted from a light source on the optical recording medium;

extremum detection means for detecting an extremum of total reflected light from a portion of the optical recording medium which is irradiated by the light spot and producing an output signal including a timing signal indicating a timing of detection of said extremum of the total reflected light;

desired tracking position changing means for changing a desired tracking position signal for tracking servo control;

control means receiving said output signal of the extremum detection means and said tracking error signal from said tracking error signal detection means for instructing said desired tracking position changing means with respect to changing of said desired tracking position signal; and light spot moving means for causing one of (a) movement of the light spot at a substantially constant speed in a direction substantially perpendicular to the track and (b) vibration of the light spot in a direction substantially perpendicular to the information recording and reproducing track in accordance with a command from said control means, wherein said control means, while said light spot moving means moves said light spot at a substantially constant speed in the direction substantially perpendicular to the track or vibrates said light spot in the direction substantially perpendicular to the track in accordance with said command from said control means, detects the tracking error signal from said tracking error signal detection means at a timing when said control means detects the timing signal indicative of the timing of detection of the extremum of the total reflected light from said extremum detection means and instructs said desired tracking position changing means to change the desired tracking position for the tracking servo control in accordance with the tracking error signal from said tracking error signal detection means in correspondence with the timing signal.

2. A tracking control apparatus comprising:

tracking error signal detection means for detecting a positional deviation of a light spot from an information recording and reproducing track formed on an optical recording medium and producing a tracking error signal representing the positional deviation, the light spot being formed by focusing a light beam emitted from a light source on the optical recording medium;

extremum detection means for detecting an extremum of total reflected light from a portion of the optical recording medium which is irradiated by the light spot and producing an output signal including a timing signal indicating a timing of detection of said extremum of the total reflected light;

desired tracking position changing means for changing a desired tracking position signal for tracking servo control; and control means receiving said output signal of the extremum detection means and the tracking error signal from said tracking error signal detection means, for instructing said desired tracking position changing means with respect to changing of the desired tracking position signal;

wherein said control means detects the timing signal produced by said extremum detection means and instructs said desired tracking position changing means to change the desired tracking position for the tracking servo control in accordance with the tracking error signal from said tracking error signal detection means in correspondence with the timing signal, said control means detects the tracking error signal from said tracking error signal detection means at the timing when said control means detects the timing signal indicative of the timing of detection of the extremum of the total reflected light from the extremum detection means a plurality of times, said control means calculates an average value of the tracking error signals thus detected, and the desired tracking position changing means changes the desired tracking position in accordance with the average value of the tracking error signals from said control means.

3. A tracking control apparatus according to claim 1, wherein, each time an optical disk is inserted into an optical disk drive associated with said tracking control apparatus, the timing signal indicative of the timing of detection of the extremum of the total reflected light by the extremum detection means is detected by the control means, and the control means instructs the desired tracking position changing means to change the desired tracking position for the tracking servo control in accordance with the positional deviation of the light spot from the information recording and reproducing track which is detected by the tracking error signal detection means in correspondence with the timing signal.

4. A tracking control apparatus according to claim 1, wherein, in the course of performing a seek operation in which the control means instructs said light spot moving means to move the light spot onto a desired track, said control means detects the tracking error signal from said tracking error signal detection means at said timing when said control means detects the timing signal indicative of the timing of detection of the extremum of the total reflected light produced by said extremum detection means and instructs the desired tracking position changing means to change the desired tracking position signal for the tracking servo control in accordance with the tracking error signal from the tracking error signal detection means in correspondence with the timing signal.

5. A tracking control apparatus according to claim 1, wherein the extremum detection means comprises phase shifting means for shifting a phase of an input signal thereto by substantially $\pi/2$ radian and zero-crossing point detection means for detecting a zero crossing timing of an output signal of said phase shifting means, thereby determining the extremum of the total reflected light in accordance with the zero crossing timing thus detected.

6. A tracking control apparatus comprising:
   a servo circuit;
   tracking error signal detection means for detecting a tracking error signal indicative of a positional deviation of a light spot from an information recording and reproducing track formed on an optical recording medium having a plurality of divided areas and (b) producing a tracking error signal representing said positional deviation of the light spot, the light spot being formed by focusing a light beam emitted from a light source on the optical recording medium;
   extremum detection means for detecting an extremum of total reflected light from a portion of the optical recording medium which is irradiated by the light spot and producing an output signal including a timing signal indicating a timing of detection of said extremum of the total reflected light;
   desired tracking position changing means for changing a desired tracking position signal which is supplied to the servo circuit to generate a tracking servo control signal;
   control means receiving said output signal of the extremum detection means and said tracking error signal from said tracking error signal detection means for instructing the desired tracking position changing means with respect to changing of said desired tracking position signal;
   light spot moving means, connected to the servo circuit, for moving the light spot in accordance with a command from said control means; and
   storage means for storing the tracking error signal from said tracking error signal detection means in accordance with the command from said control means,
   wherein the tracking error signal is (a) obtained at a time when said timing signal is produced indicating that the extremum of the total reflected light is detected by the extremum detection means with respect to each of said plurality of divided areas of the optical recording and reproducing medium while said light spot moving means moves the light spot at a substantially constant speed in a direction substantially perpendicular to the information recording and reproducing track and (b) stored in the storage means for each of said plurality of divided areas of the optical recording medium in accordance with a command from said control means, and the control means instructs the desired tracking position changing means to change the desired tracking position for the tracking servo control in accordance with an output of the storage means, which output corresponds to one of the divided areas of the optical recording and reproducing medium, so as to enable the servo circuit and the light spot moving means to perform the tracking servo control when one of information recording, reproducing and erasing operations is performed on the information recording and reproducing track.

7. A tracking control apparatus according to claim 6, wherein, each time an optical disk is inserted into an optical disk drive associated with said tracking control apparatus, the timing signal indicative of the timing of detection of the extremum of the total reflected light produced by said extremum detection means is detected by said control means, and said control means instructs said desired tracking position changing means to change the desired tracking position signal for the tracking servo control in accordance with the positional deviation of the light spot from the information recording and reproducing track which is detected by said tracking error signal detection means in correspondence with the timing signal.

8. A tracking control apparatus according to claim 6, wherein, in the course of performing a seek operation in which said control means instructs said light spot moving means to move the light spot onto a desired track, said control means detects the tracking error signal from said tracking error signal detection mans at the timing when said control means detects the timing signal indicative of the timing of detection of the extremum of the total reflected light produced by said extremum detection means and instructs said desired tracking position changing means to change the desired tracking position signal for the tracking servo control in accordance with the tracking error signal from said tracking error signal detection means in correspondence with the timing signal.

9. A tracking control apparatus according to claim 6, wherein the extremum detection means comprises phase shifting means for shifting a phase of an input signal thereto by substantially $\pi/2$ radian and zero-crossing point detection means for detecting a zero-crossing timing of an output signal of said phase shifting means, thereby determining the extremum of the total reflected light at the zero crossing timing thus detected.

10. A tracking control apparatus comprising:
    a servo circuit;
    tracking error signal detection means for (a) detecting a positional deviation of a light spot from an information recording and reproducing track formed on an optical recording medium having a plurality of divided areas and (b) producing a tracking error signal representing said positional deviation, the light spot being formed by focusing a light beam emitted by a light source on the optical recording medium;
    extremum detection means for detecting an extremum of total reflected light from a portion of the optical recording medium which is irradiated by the light spot and producing an output signal including a timing signal indicating a timing of detection of said extremum of the total reflected light;
    desired tracking position changing means for changing a desired tracking position signal which is supplied to the servo circuit to generate a tracking servo control signal;
    control means receiving said output signal of the extremum detection means and said tracking error signal of the tracking error signal detection means for instructing the desired tracking position changing means with respect to changing of said desired tracking position signal;
    light spot moving means, connected to the servo circuit, for moving the light spot in accordance with a command from said control means; and
    storage means for storing coefficients of an approximation function of predetermined order for the tracking error signal in accordance with a command from said control means,
    wherein the control means detects said tracking error signal at a time when said timing signal is produced indicating that the extremum of the total reflected light is detected by the extremum detection means for said plurality of divided areas of the optical recording medium while said light spot moving means moves the light spot at a substantially constant speed in a direction substantially perpendicular to the information recording and reproducing track, and the control means calculates the coefficients of the approximation function of predetermined order for the tracking error signal and stores the coefficients of the approximation function in the storage means, and, when one of information recording, reproducing and erasing operations is performed on the information recording and reproducing track on the optical recording medium, the control means instructs the desired tracking position changing means to change desired tracking positions for the respective divided areas of the optical recording medium based on the coefficients stored in the storage means and to produce resultant desired tracking position signals, thereby making it possible for the servo circuit and the light spot moving means to perform tracking servo control.

11. A tracking control apparatus according to claim 10, wherein, each time an optical disk is inserted into an optical disk drive associated with said tracking control apparatus, the timing signal indicative of the timing of detection of the extremum of the total reflected light produced by said extremum detection means is detected by said control means, and said control means instructs said desired tracking position changing means to change the desired tracking position signal for the tracking servo control in accordance with the positional deviation of the light spot from the information recording and reproducing track which is detected by said tracking error signal detection means in correspondence with the timing signal.

12. A tracking control apparatus according to claim 10, wherein, in the course of performing a seek operation in which said control means instructs said light spot moving means to move the light spot onto a desired track, said control means detects the tracking error signal from said tracking error signal detection means at the timing when said control means detects the timing signal indicative of the timing of detection of the extremum of the total reflected light produced by said extremum detection means and instructs said desired tracking position changing means to change the desired tracking position signal for the tracking servo control in accordance with the tracking error signal from said tracking error signal detection means in correspondence with the timing signal.

13. A tracking control apparatus according to claim 10, wherein the extremum detection means comprises phase shifting means for shifting a phase of an input signal thereto by substantially $\pi/2$ radian and zero-crossing point detection means for detecting a zero crossing timing of an output signal of said phase shifting means, thereby determining the extremum of the total reflected light at the zero crossing timing thus detected.

14. A tracking control apparatus comprising:
tracking error signal detection means for detecting a positional deviation of a light spot from an information recording and reproducing track formed on an optical recording medium and for producing a tracking error signal representing said positional deviation, the light spot being formed by focusing a light beam emitted from a light source on the optical recording medium;

light spot moving means for moving the light spot in a direction substantially perpendicular to the information recording and reproducing track;

extremum detection means for detecting an extremum of total reflected light from a portion of the optical recording medium which is irradiated by the light spot and producing an output signal including a timing signal indicating a timing of detection of said extremum of the total reflected light;

maximum point detection means for detecting a maximum point of an amplitude of a signal produced through a photodetector which detects a light beam reflected from the optical recording medium and producing an output signal including a second timing signal indicating a timing of detection of said maximum point of the amplitude of the signal produced through the photodetector;

desired tracking position changing means for changing a desired tracking position signal for tracking servo control;

storage means for storing the tracking error signal from said tracking error signal detection means; and control means, connected to said tracking error signal detection means, said light spot moving means, said extremum detection means, said maximum point detection mans, said desired tracking position changing means and said storage means, for outputting a command to control the desired tracking position changing means and the storage means in accordance with said output signal of one of the extremum detection means and the maximum point detection means and said tracking error signal produced by the tracking error signal detection means.

15. A tracking control apparatus according to claim 14, wherein, in a region of the optical recording medium where no information has been recorded, the control means causes the storage means to store the tracking error signal at a time when said first timing signal is generated indicating that the extremum of the total reflected light is detected by the extremum detection means, while, in a region of the optical recording medium where information has been recorded, the control means causes the storage means to store the tracking error signal at a time when said second timing signal is generated indicating that the maximum point of the amplitude of the signal produced through the photodetector is detected by the maximum point detection means, while the light spot moving means moves the light spot at a substantially constant speed in a direction substantially perpendicular to the information recording and reproducing track in accordance with the command from said control means, and wherein, when one of information recording, reproducing and erasing operations is performed on the information recording and reproducing track on the optical recording medium, in a region of the optical recording medium where no information has been recorded, the control means instructs the desired tracking position changing means to change the desired tracking position signal in accordance with an output of the storage means corresponding to the tracking error signal at a time when said first timing signal is produced indicating that the extremum of the total reflected light is detected by the extremum detection means, to thereby perform tracking servo control, while, in a region of the optical recording medium where information has been recorded, the control means instructs the desired tracking position changing means to change the desired tracking position signal in accordance with an output of the storage means corresponding to the tracking error signal at a time when said second timing signal is produced indicating that the maximum point of the amplitude of the signal produced through the photodetector is detected by the maximum point detection means, to thereby perform tracking servo control.

16. A tracking control apparatus according to claim 14, wherein, each time an optical disk is inserted into an optical disk drive associated with said tracking control apparatus, the first timing signal indicative of the timing of detection of the extremum of the total reflected light produced by said extremum detection means is detected by said control means, and said control means instructs said desired tracking position changing means to change the desired tracking position signal for the tracking servo control in accordance with the positional deviation of the light spot from the information recording and reproducing track which is detected by said tracking error signal detection means in correspondence with the first timing signal.

17. A tracking control apparatus according to claim 14, wherein, in the course of performing a seek operation in which said control means instructs said light spot moving means to move the light spot onto a desired track, said control means detects the tracking error signal from said tracking error signal detection means at the timing when said control means detects said first timing signal indicative of the timing of detection of the extremum of the total reflected light produced by said extremum detection means and instructs said desired tracking position changing means to change the desired tracking position signal for the tracking servo control in accordance with the tracking error signal from said tracking error signal detection means in correspondence with the first timing signal.

18. A tracking control apparatus according to claim 14, wherein the extremum detection means comprises phase shifting means for shifting a phase of an input signal thereto by substantially $\pi/2$ radian and zero-crossing point detection mans for detecting a zero crossing timing of an output signal of said phase shifting means, thereby determining the extremum of the total reflected light at the zero crossing timing thus detected.

* * * * *